United States Patent Office 2,847,344
Patented Aug. 12, 1958

2,847,344

LOWER-ALKYL 5-AMINO-2-(TERTIARY-AMINO-ALKOXY) BENZOATES AND THEIR PREPARATION

Raymond O. Clinton, North Greenbush Township, Rensselaer County, and Stanley C. Laskowski, Menands, N. Y., assignors to Sterling Drug Inc., New York, N. Y., a corporation of Delaware No Drawing. Application August 29, 1956
Serial No. 606,795

20 Claims. (Cl. 167—52)

This invention relates to compositions of matter of the class of lower-alkyl aminobenzoates, to processes for their preparation, and to local anesthetic compositions including the novel compounds herein disclosed together with excipients.

The invention here resides in a composition having a molecular structure in which a primary amino substituent is attached to the 5-position of the benzene ring of a lower-alkyl 2-[lower-tertiary-amino(polycarbon-lower-alkoxy)]benzoate and acid addition salts thereof. The invention also resides in a process for forming these compounds.

In our U. S. Patent 2,642,432 we describe the corresponding isomeric lower-alkyl 4-amino-2-[lower-tertiary-amino(polycarbon-lower-alkoxy)]benzoates. We have now found that the 5-amino isomers of the present invention have improved pharmacodynamic properties, especially as local anesthetic agents, when compared with our previously reported lower-alkyl 4-amino-2-(tertiary-aminoalkoxy)benzoates and, also, when compared with accepted local anesthetic preparations of commerce.

Our novel esters in free base form have the Formula I

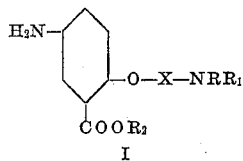

where X is a polycarbon-lower-alkylene radical whose two free valence bonds are on different carbon atoms, $NRR_1$ is preferably a member of the group consisting of di-(lower-alkyl)amino, 1-piperidyl, (lower-alkylated)-1-piperidyl, 1-pyrrolidyl, (lower-alkylated)-1-pyrrolidyl and 4-morpholinyl, and $R_2$ is a lower-alkyl radical.

Pharmacological evaluation of the 5-aminobenzoates of our invention by standard procedures has shown them to have improved local anesthetic properties when compared with known local anesthetic agents. Our alkyl 5-amino-2-(tertiaryaminoalkoxy)benzoates are more active and less irritating than our previously reported isomeric alkyl 4-amino-2-(tertiaryaminoalkoxy)benzoates, ibid., and also have improved properties compared with commercially acceptable local anesthetic preparations such as 2-diethylaminoethyl 4-aminobenzoate hydrochloride (procaine HCl) and 2-diethylaminoethyl 4-amino-2-n-propoxybenzoate hydrochloride (propoxycaine HCl). For example, our ethyl 5-amino-2-(2-diethylaminoethoxy) benzoate as its hydrochloride salt when tested by the intracutaneous wheal test in guinea pigs [Bulbring and Wajda, J. Pharmacol. 85, 78 (1945)] was found to be about twice as active as the isomeric ethyl 4-amino-2-(2-diethylaminoethoxy)benzoate as its dihydrochloride and when tested by the trypan blue test in rabbits [as reported by Luduena and Hoppe, J. Pharm. & Exptl. Ther. 104, 40 (1952)] was found to be only about one-fourth as irritating as the 4-amino isomer. Similarly, when tested according to said procedures, our ethyl 5-amino-2-[3-(1-piperidyl)propoxy]benzoate as its hydrochloride was found to be about five times more active and only one-half as irritating as its corresponding isomeric ethyl 4-amino-2-[3-(1-piperidyl)propoxy]benzoate in the form of its phosphate salt. Our compounds also compare favorably with commercial anesthetic preparations; for example, our ethyl 5-amino-2-(2-diethylaminoethoxy)benzoate hydrochloride when tested by the above-mentioned procedures was found to be ten times more active than procaine and no more irritating, and to have about the same activity and only about one-half the irritancy of propoxycaine hydrochloride.

In the above general Formula I, the polycarbon-lower-alkylene radical designated as X has preferably two to four carbon atoms and has its two free valence bonds on different carbon atoms. Thus, X includes such groups as $-CH_2CH_2-$, $-CH_2CH_2CH_2-$, $$-CH_2CH(CH_3)$$

$-CH_2CH_2CH_2CH_2-$, $-CH_2CH(CH_3)CH_2-$, and the like. The lower-tertiary-amino radical shown above as $NRR_1$ comprehends dialkylamino radicals where R and $R_1$ are lower-alkyl groups, alike or different and each alkyl group having one to six carbon atoms, such dialkylamino radicals including dimethylamino, diethylamino, ethylmethylamino, diisopropylamino, ethyl-n-propylamino, di-n-butylamino, di-n-hexylamino, and the like. Further, the lower-tertiary-amino radical designated as $NRR_1$ encompasses saturated N-heteromonocyclic radicals having five or six ring atoms, illustrated by groups such as 1-piperidyl; (lower-alkylated)-1-piperidyl such as 2-methyl-1-piperidyl, 3-ethyl-1-piperidyl, 4-methyl-1-piperidyl, 2,6-dimethyl-1-piperidyl; 1-pyrrolidyl; (lower-alkylated)-1-pyrrolidyl such as 2-methyl-1-pyrrolidyl, 2,5-dimethyl-1-pyrrolidyl; 4-morpholinyl; and the like. The lower-alkyl radical $R_2$ has preferably one to six carbon atoms and comprehends such radicals as methyl, ethyl, n-propyl, isopropyl, n-butyl, isobutyl, 2-butyl, n-amyl, n-hexyl, and the like.

The compounds of our invention were prepared preferably according to the procedure represented by the following series of equations where X, $NRR_1$ and $R_2$ have the meanings given hereinabove and halogen is chlorine, bromine or iodine:

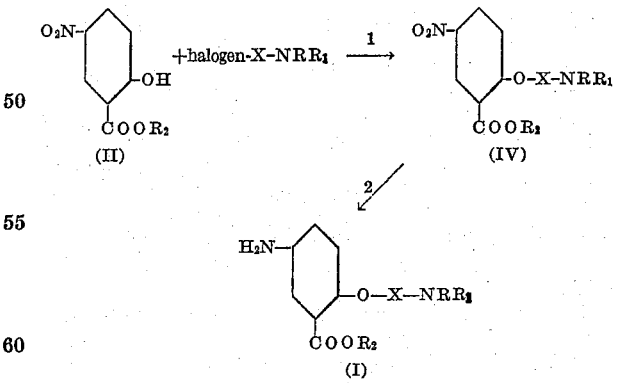

In step 1 a lower-alkyl 5-nitro-2-hydroxybenzoate (II) is converted into a lower-alkyl 5-nitro-2-(tertiary-aminoalkoxy)benzoate (IV) by reaction with a tertiary-aminoalkyl halide (III). In step 2 the lower-alkyl 5-nitro-2-(tertiary-aminoalkoxy)benzoate (IV) is reduced to yield the corresponding lower-alkyl 5-amino-2-(tertiary-aminoalkoxy)benzoate (I). A specific illustration of this procedure is the formation of ethyl 5-amino-2-(2-diethylaminoethoxy)benzoate by reacting ethyl 5-nitro-2-hydroxybenzoate, preferably in the form of an alkali metal salt, with a 2-diethylaminoethyl halide, preferably the chloride, to yield ethyl 5-nitro-2-(2-diethylaminoethoxy) benzoate, and reducing this 5-nitro compound to yield the corresponding ethyl 5-amino - 2 - (2-diethylamino ethoxy)benzoate.

Step 1 is carried out preferably using a lower-alkyl 5-nitro-2-hydroxybenzoate in the form of a metal derivative with a tertiary-aminoalkyl halide. Alternatively, step 1 can be carried out using a lower-alkyl 5-nitro-2-hydroxybenzoate itself, however, with a resulting decrease in the yield of the lower-alkyl 5-nitro-2-(tertiary-aminoalkoxy) benzoate.

The reduction step 2 is carried out either by chemical methods or by catalytic hydrogenation. Suitable chemical reducing agents include iron and hydrochloric acid, ferrous sulfate and ammonia, tin and hydrochloric acid, sodium hydrosulfite, etc. In practicing our invention, we preferably used iron and hydrochloric acid. Catalysts suitable when catalytic hydrogenation is employed include Raney nickel, platinum, palladium or other catalysts generally effective to catalyze hydrogenation of nitro groups to amino groups.

Step 1 can also be carried out stepwise, that is, by first haloalkylating a lower-alkyl 5-nitro-2-hydroxybenzoate (II) to form a lower-alkyl 5-nitro-2-(haloalkoxy)benzoate which is then reacted with a secondary amine having the formula $HNRR_1$. The first step can be accomplished by reacting a lower-alkyl 5-nitro-2-hydroxybenzoate or a metal derivative thereof with a haloalkylating agent, preferably a haloakyl ester of a strong inorganic acid or an organic sulfonic acid, such as a haloalkyl paratoluenesulfonate, haloalkyl benzenesulfonate, haloalkyl halide, and the like. As illustrations of this stepwise procedure, ethyl 5-nitro-2-hydroxybenzoate is haloalkylated by reacting its sodium salt with 3-chloropropyl paratoluenesulfonate to form ethyl 5-nitro-2-(3-chloropropoxy)benzoate which then is reacted with diethylamine or piperidine to form ethyl 5-nitro-2-(3-diethylaminopropoxy)benzoate or ethyl 5-nitro-2-[3-(1-piperidyl)propoxy]-benzoate, respectively.

Our new lower-alkyl 5-amino-2-[tertiary-amino-(polycarbon-lower-alkoxy)]benzoates are useful in the free base form or in the form of acid addition salts, and both forms are within the purview of the invention. The acids which can be used to prepare acid addition salts are preferably those which produce, when combined with the free base, salts whose anions are relatively innocuous to the animal organism in therapeutic doses of the salts, so that the beneficial physiological properties inherent in the free base are not vitiated by side effects ascribable to the anions. In practicing our invention, we found it convenient to employ the hydrochloride salts. However, other appropriate acid addition salts are those derived from mineral acids such as hydrobromic acid, hydriodic acid, nitric acid, phosphoric and sulfuric acid; and organic acids such as acetic acid, citric acid, tartaric acid, lactic acid, quinic acid, methanesulfonic acid, ethanesulfonic acid, and the like, giving the hydrobromide, hydriodide, nitrate, phosphate or acid phosphate, sulfate or acid sulfate, acetate, citric or acid citrate, tartrate or acid tartrate, lactate, quinate, methanesulfonate and ethanesulfonate salts, respectively.

The molecular structures of our lower-alkyl 5-amino-2-[tertiary-amino-(polycarbon-lower-alkoxy)]benzoates are established by their mode of synthesis and corroborated by the correspondence of calculated and found values for the elementary analyses for representative examples.

The following examples will further illustrate the invention without, however, limiting it thereto.

EXAMPLE 1

A. *Lower-alkyl 5-nitro-2-(dialkylaminoalkoxy)benzoates*

The preparation of these compounds is illustrated by the following preparation of ethyl 5-nitro-2-(2-diethylaminoethoxy)benzoate. To a stirred solution of 39.0 g. of ethyl 5-nitro-2-hydroxybenzoate in 1600 ml. of dry toluene was added a solution of sodium ethoxide which was obtained by adding 4.25 g. of sodium to 500 ml. of anhydrous ethanol. The stirred suspension, containing the precipitated canary-yellow colored sodiophenolate, was then distilled until all ethanol had been removed. To the resulting suspension was added a solution of 27.5 g. of 2-diethylaminoethyl chloride in 400 ml. of dry toluene, and the mixture was stirred at reflux for twenty-two hours. The precipitated salt was filtered off using a filter-aid pad, and the filter cake was washed with dry benzene. The combined filtrate and washings were concentrated in vacuo leaving a residue of ethyl 5-nitro-2-(2-diethylaminoethoxy)benzoate as a golden-yellow colored, mobile oil.

The hydrochloride of this basic ester was obtained by treating a solution of the ester in ethyl acetate with an excess of ethereal hydrogen chloride. The resulting precipitate was recrystallized twice from absolute ethanol-n-hexane to yield, as white cottony needles, ethyl 5-nitro-2-(2-diethylaminoethoxy)benzoate monohydrochloride, M. P. 150.1–151.3° C. (corr.).

*Analysis.*—Calcd. for $C_{15}H_{22}N_2O_5 \cdot HCl$: $N_{NO_2}$, 4.03; $Cl^-$, 10.22. Found: $N_{NO_2}$, 3.99; $Cl^-$, 10.36.

Ethyl 5-nitro-2-(2-dimethylaminoethoxy)benzoate was prepared following the above procedure using 31.7 g. of ethyl 5-nitro-2-hydroxybenzoate, 1200 ml. of dry toluene, 3.5 g. of sodium in 150 ml. of anhydrous ethanol and 17.8 g. of 2-dimethylaminoethyl chloride. This compound as its monohydrochloride melted at 161.4–163.4° C. (corr.)

*Analysis.*—Calcd. for $C_{13}H_{18}N_2O_5 \cdot HCl$: $Cl^-$, 11.12; N, 8.79. Found: $Cl^-$, 11.31; N, 8.96.

Other lower-alkyl 5-nitro-2-(dialkylaminoalkoxy) benzoates that can be prepared according to the foregoing procedure used for the preparation of ethyl 5-nitro-2-(2-diethylaminoethoxy)benzoate using the appropriate lower-alkyl 5-nitro-2-hydroxybenzoate and dialkylaminoalkyl halide include: ethyl 5-nitro-2-(2-di-n-butylaminoethoxy)benzoate using ethyl 5-nitro-2-hydroxybenzoate and 2-di-n-butylaminoethyl bromide; n-hexyl 5-nitro-2-(2-diethylaminoethoxy)benzoate using n-hexyl 5-nitro-2-hydroxybenzoate and 2-diethylaminoethyl iodide; methyl 5-nitro-2-(4-diethylaminobutoxy)benzoate using methyl 5-nitro-2-hydroxybenzoate and 4-diethylaminobutyl chloride; and the like. These basic esters can be isolated in free base form or in the form of their acid addition salts, preferably the hydrochlorides.

B. *Lower-alkyl 5-amino-2-(dialkylaminoalkoxy) benzoates*

The preparation of these esters is illustrated by the following synthesis of ethyl 5 - amino - 2 - (2-diethylaminoethoxy)benzoate. To a stirred boiling suspension of 48.1 g. of powdered iron metal in 400 ml. of 50% aqueous ethanol was added 1 ml. of concentrated hydrochloric acid, followed by the slow addition of 44.5 g. of ethyl 5-nitro-2-(2-diethylaminoethoxy)benzoate. When the exothermic reaction had subsided, the mixture was stirred and heated for an additional twenty minutes, treated with 10 g. of sodium bicarbonate, and filtered while hot. The filter-cake was washed with hot ethanol, and the combined filtrate and washings were distilled in vacuo until all the ethanol had been removed. The mixture of oil and water that remained was extracted with ethyl acetate; and the ethyl acetate extracts were washed thoroughly with water, dried over anhydrous magnesium sulfate, and evaporated in vacuo. Ethyl 5-amino-2-(2-diethylaminoethoxy)benzoate was obtained as a dark amber-colored oil.

The monohydrochloride salt of this basic ester was obtained as follows: To a solution of 6.4 g. of the basic ester in 40 ml. of ethyl acetate was added an excess of ethereal hydrogen chloride. The precipitated dihydrochloride was washed four times with ethyl acetate by decantation and then dissolved in 25 ml. of absolute ethanol. To this solution was added a solution of 9.6 g. of ethyl 5-amino-2-(2-diethylaminoethoxy)benzoate in 60 ml. of ethyl acetate, and the mixture was cooled thoroughly. The precipitated crystalline monohydrochloride of ethyl 5-amino-2-(2-diethylaminoethoxy)benzoate was recrystallized from absolute-ethanol-ethyl acetate to form rosettes of white needles, M. P. 122.8–123.7° C. (corr.).

*Analysis.*—Calcd. for $C_{15}H_{24}N_2O_3 \cdot HCl$: N, 8.84; $Cl^-$, 11.19. Found: N, 8.85; $Cl^-$, 10.99.

Other lower-alkyl 5-amino-2-(dialkylaminoalkoxy)-benzoates that can be prepared according to the foregoing procedure used for the preparation of ethyl 5-amino-2-(2-diethylaminoethoxy)benzoate using the appropriate lower-alkyl 5-nitro-2-(dialkylaminoalkoxy)benzoate include: ethyl 5-amino-2-(2-di-n-butylaminoethoxy)benzoate using ethyl 5-nitro-2-(2-di-n-butylaminoethoxy)benzoate; n-hexyl 5-amino-2-(2-diethylaminoethoxy)benzoate using n-hexyl 5-nitro-2-(2-diethylaminoethoxy)benzoate; methyl 5-amino-2-(4-diethylaminobutoxy)benzoate using methyl 5-nitro-2-(4-diethylaminobutoxy)benzoate; and the like. These basic esters can be isolated in free base form or in the form of their acid addition salts, preferably the hydrochlorides. Alternatively, these compounds can be prepared directly in the form of their monohydrochloride salts from the corresponding lower-alkyl 5-nitro-2-(dialkylaminoalkoxy)benzoate monohydrochlorides using the procedure given in the following paragraph.

Ethyl 5 - amino - 2 - (2-dimethylaminoethoxy)benzoate was prepared by catalytic hydrogenation of the corresponding 5-nitro compound as follows: 11.7 g. of ethyl 5-nitro-2-(2-dimethylaminoethoxy)benzoate as its hydrochloride in a solution of ethanol (total volume of 150 ml.) was treated with hydrogen (50 lbs. pressure) at room temperature in the presence of 1.0 g. of 7% $PdCl_2$ on charcoal. The theoretical quantity of hydrogen was taken up in about thirty-five minutes. The reaction mixture was filtered, the filter pad washed with absolute ethanol, and the filtrate evaporated in vacuo to yield a golden yellow oil. The oil was dissolved in ethyl acetate and the resulting solution evaporated to dryness in vacuo. The remaining material was dissolved in about 50 ml. of absolute ethanol and cooled, whereupon crystals separated. The mixture was diluted with ethyl acetate and ether, mixed well, and the solid crystalline material collected by filtration. The solid was recrystallized from about 125 ml. of isopropanol to yield the product, ethyl 5-amino-2-(2-dimethylaminoethoxy)benzoate as its hydrochloride, M. P. 160.4–163.0° C. (corr.).

*Analysis.*—Calcd. for $C_{13}H_{20}N_2O_3 \cdot HCl$: N, 9.70; $Cl^-$, 12.28. Found: N, 9.58; $Cl^-$, 12.22.

EXAMPLE 2

A. *Lower-alkyl 5-nitro-2-(tertiary-aminoalkoxy)-benzoates*

The preparation of these compounds where the tertiary-amino radical is a saturated N-heteromonocyclic radical having five to six ring atoms is illustrated by the following synthesis of ethyl 5-nitro-2-[3-(1-piperidyl)propoxy]-benzoate. This preparation was carried out following the procedure described in Example 1A for the preparation of ethyl 5-nitro-2-(2-diethylaminoethoxy)benzoate using 39.0 g. of ethyl 5 nitro-2-hydroxybenzoate, 4.25 g. of sodium in 500 ml. of absolute ethanol, 32.6 g. of 3-(1-piperidyl)propyl chloride, 1600 ml. of dry toluene and a reflux period of twenty-six hours with stirring. The product, ethyl 5-nitro-2-[3-(1-piperidyl)propoxy]benzoate was obtained as a golden-yellow colored oil which gradually crystallized. After two recrystallizations from absolute ethanol, this basic ester formed pale yellow plates, M. P. 56.7–57.7° C. (corr.).

*Analysis.*—Calcd. for $C_{17}H_{24}N_2O_5$: N, 8.33. Found: N, 8.16.

Ethyl 5 - nitro - 2 - [3 - (1 - piperidyl)propoxy]-benzoate monohydrochloride was prepared from the basic ester following the procedure described for the preparation of the monohydrochloride of ethyl 5-nitro-2-(2-diethylaminoethoxy)benzoate in Example 1A. The monohydrochloride was obtained as white crystals when recrystallized from ethanol-ether, M. P. 144.5–147.7° C. (corr.).

*Analysis.*—Calcd. for $C_{17}H_{24}N_2O_5 \cdot HCl$: $N_{NO_2}$, 3.76; $Cl^-$, 9.51. Found: $N_{NO_2}$, 3.60; $Cl^-$, 9.30.

Other lower-alkyl 5-nitro-2-(tertiary-aminoalkoxy)-benzoates that can be prepared according to the foregoing procedure used for the preparation of ethyl 5-nitro-2-[3-(1-piperidyl)propoxy]benzoate using the appropriate lower-alkyl 5-nitro-2-hydroxybenzoate and tertiary-aminoalkyl halide include: isobutyl 5-nitro-2-[3-(1-pyrrolidyl)propoxy]benzoate using isobutyl 5-nitro-2-hydroxybenzoate and 3-(1-pyrrolidyl)propyl bromide; n-propyl 5-nitro-2-[2-(2,5-dimethyl-1-pyrrolidyl)ethoxy]-benzoate using n-propyl 5-nitro-2-hydroxybenzoate and 2-(2,5-dimethyl-1-pyrrolidyl)ethyl chloride; ethyl 5-nitro-2-[2-(4-morpholinyl)ethoxy]benzoate using ethyl 5-nitro-2-hydroxybenzoate and 2-(4-morpholinyl)ethyl chloride; ethyl 5-nitro-2-[3-(2-methyl-1-piperidyl)propoxy]benzoate using ethyl 5-nitro-2-hydroxybenzoate and 3-(2-methly-1-piperidyl)propyl chloride; ethyl 5-nitro-2-[2-(2,6-dimethyl-1-piperidyl)ethoxy]benzoate using ethyl 5-nitro-2-hydroxybenzoate and 2-(2,6-dimethyl-1-piperidyl)ethyl chloride; and the like. These basic esters can be isolated in the form of their free base or as their acid addition salts, preferably the hydrochlorides, e. g., ethyl 5-nitro-2-[3-(2-methyl-1-piperidyl)propoxy]benzoate monohydrochloride melting at 94.4–105.4° C. (corr.).

*Analysis.*—Calcd. for $C_{18}H_{26}N_2O_5 \cdot HCl$: $Cl^-$, 9.16; N, 7.24. Found: $Cl^-$, 8.85; N, 7.06 and ethyl 5-nitro-2-[2-(2,6-dimethyl-1-piperidyl)ethoxy]benzoate monohydrochloride melting at 187.0–190.2° C. (corr.).

*Analysis.*—Calcd. for $C_{18}H_{26}N_2O_5 \cdot HCl$: $Cl^-$, 9.16; N, 7.24. Found: $Cl^-$, 9.03; N, 6.95.

B. *Lower-alkyl 5-amino-2-(tertiary-aminoalkoxy)-benzoates*

These esters where the tertiary-amino radical is a saturated N-heteromonocyclic radical having five to six ring atoms were prepared using the procedure described above in Example 1B, as illustrated in the following preparation of ethyl 5-amino-2-[3-(1-piperidyl)propoxy]benzoate, using 28.6 g. of ethyl 5-nitro-2-[3-(1-piperidyl)propoxy]benzoate, 28.6 g. of powdered iron, 400 ml. of 50% aqueous ethanol, 1 ml. of concentrated hydrochloric acid and 10 g. of sodium bicarbonate. The basic ester was obtained as an amber oil.

The monohydrochloride was prepared following the procedure described above in Example 1B for the preparation of the monohydrochloride of ethyl 5-amino-2-(2-diethylaminoethoxy)benzoate by first converting 10.6 g. of ethyl 5-amino-2-[3-(1-piperidyl)propoxy]benzoate into the dihydrochloride, treating the dihydrochloride solution with an additional 15.9 g. of the basic ester and isolating the monohydrochloride, which was obtained as white crystals, M. P. 178.1–180.1° C. (corr.) when recrystallized from absolute ethanol.

*Analysis.*—Calcd. for $C_{17}H_{26}N_2O_3 \cdot HCl$: N, 8.17; $Cl^-$, 10.34. Found: N, 7.93; $Cl^-$, 10.39.

Other lower-alkyl 5-nitro-2-(tertiary-aminoalkoxy) benzoates that can be prepared according to the foregoing procedure used for the preparation of ethyl 5-amino-2-[3-(1-piperidyl)propoxy]benzoate using the appropriate lower-alkyl 5-nitro-2-(tertiary-aminoalkoxy) benzoate include: isobutyl 5-amino-2-[3-(1-pyrrolidyl)-propoxy]benzoate using isobutyl 5-nitro-2-[3-(1-pyrrolidyl)propoxy]benzoate; n-propyl 5-amino-2-[2-(2,5-dimethyl-1-pyrrolidyl)ethoxy]benzoate using n-propyl 5- nitro - 2 - [2 - (2,5 - dimethyl - 1 - pyrrolidyl)ethoxy]benzoate; ethyl 5-amino-2-[2-(4-morpholinyl)ethoxy]benzoate using ethyl 5-nitro-2-[2-(4-morpholinyl)ethoxy]benzoate; ethyl 5-amino-2-[3-(2-methyl-1-piperidyl)propoxy]benzoate using ethyl 5-nitro-2-[3-(2-methyl-1-piperidyl)propoxy]benzoate; ethyl 5-amino-2[2-(2,6-dimethyl-1-piperidyl)ethoxy]benzoate using ethyl 5-nitro-2-[2-(2,6-dimethyl-1-piperidyl)ethoxy]benzoate; and the like. These basic esters can be isolated in their free base form or in the form of their acid addition salts, preferably the hydrochlorides.

Another aspect of our invention resides in local anesthetic compositions including the novel compounds disclosed herein together with excipients. By an excipient we mean any inert substance used to give the compositions a suitable form or consistency. In the case of liquid compositions for topical or injectable administration, the excipient is sterile water, optionally containing additional compatible ingredients for stabilizing and the like purposes such as methyl parahydroxybenzoate, chlorobutanol, sodium bisulfite, sodium chloride, dextrose, inositol, etc., or containing other pharmacodynamically active ingredients such as a vasoconstrictor agent, e. g., epinephrine, phenylephrine. In the case of ointment or cream compositions for topical application, the excipient is preferably petrolatum, optionally containing additional compatible ingredients such as lanolin, mineral oil, white wax, wool fat, etc. Illustrative of such local anesthetic compositions of our invention are the following: an injectable aqueous preparation comprising in each cubic centimeter 20 mg. of ethyl 5-amino-2-(2-diethylaminoethoxy)benzoate hydrochloride, 0.01 g. of epinephrine, 1.5 mg. of sodium bisulfite, 6.5 mg. of sodium chloride and distilled water; a topical aqueous composition comprising 10 mg. of ethyly 5-amino-2-[3-(1-piperidyl)propoxy]benzoate hydrochloride, 4 mg. of chlorobutanol and enough distilled water to make 1 cc. of solution; an ointment comprising 1% of ethyl 5-amino-2-(2-diethylaminoethoxy)benzoate dissolved in white petrolatum.

We claim:
1. A composition of matter selected from the group consisting of: (a) a lower-alkyl 5-amino-2-[lower-tertiary-amino(polycarbon-lower-alkoxy)]benzoate where the lower-tertiary-amino radical is a member of the group consisting of di-(lower-alkyl)amino, 1-piperidyl, (lower-alkylated)-1-piperidyl, 1-pyrrolidyl, (lower-alkylated)-1-pyrrolidyl and 4-morpholinyl; and, (b) its non-toxic acid addition salts.

2. A lower-alkyl 5-amino-2-[lower-tertiary-amino(polycarbon-lower-alkoxy)]benzoate where the lower-tertiary-amino radical is a member of the group consisting of di-(lower-alkyl)amino, 1-piperidyl, (lower-alkylated)-1-piperidyl, 1-pyrrolidyl, (lower-alkylated)-1-pyrrolidyl) and 4-morpholinyl.

3. A non-toxic acid addition salt of the compound of claim 2.

4. A lower-alkyl 5-amino-2-tertiary-aminoalkoxybenzoate having the formula

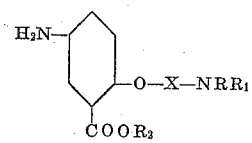

where X is a polycarbon-lower-alkylene radical whose two free valence bonds are on different carbon atoms, NRR₁ is a member of the group consisting of di(lower-alkyl)amino, 1-piperidyl, (lower-alkylated)-1-piperidyl, 1-pyrrolidyl, (lower-alkylated)-1-pyrrolidyl and 4-morpholinyl, and R₂ is a lower-alkyl radical.

5. A non-toxic acid addition salt of the compound of claim 4.

6. A lower-alkyl 5-amino-2-dialkylaminoalkoxybenzoate having the formula

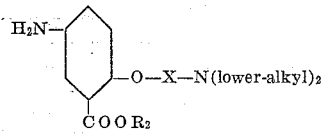

where X is a polycarbon-lower-alkylene radical whose two free valence bonds are on different carbon atoms and R₂ is a lower-alkyl radical.

7. A non-toxic acid addition salt of the compound of claim 6.

8. A lower-alkyl 5-amino-2-[(1-piperidyl)alkoxy]benzoate having the formula

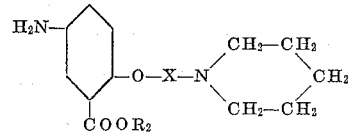

where X is a polycarbon-lower-alkylene radical whose two free valence bonds are on different carbon atoms and R₂ is a lower-alkyl radical.

9. A non-toxic acid addition salt of the compound of claim 8.

10. Ethyl 5-amino-2-(2-diethylaminoethoxy)benzoate.
11. Ethyl 5-amino-2-(2-diethylaminoethoxy)benzoate hydrochloride.
12. Ethyl 5-amino-2-[3-(1-piperidyl)propoxy]benzoate.
13. Ethyl 5-amino-2-[3-(1-piperidyl)propoxy]benzoate hydrochloride.

14. A process for the preparation of a lower-alkyl 5-amino - 2 - [lower - tertiary - amino(polycarbon - lower-alkoxy)]benzoate where the lower-tertiary-amino radical is a member of the group consisting of di-(lower-alkyl)amino, 1-piperidyl, (lower-alkylated)-1-piperidyl, 1-pyrrolidyl, (lower-alkylated)-1-pyrrolidyl and 4-morpholinyl which comprises reacting the corresponding lower-alkyl 5-nitro-2-(tertiary-aminoalkoxy)benzoate with a reducing agent effective to reduce nitro groups to amino groups.

15. A process for the preparation of a lower-alkyl 5-amino-2-tertiary-aminoalkoxybenzoate having the formula

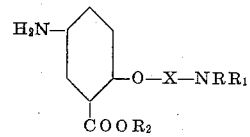

where X is a polycarbon-lower-alkylene radical whose two free valence bonds are on different carbon atoms, NRR₁ is a member of the group consisting of di-(lower-alkyl)amino, 1-piperidyl, (lower-alkylated)-1-piperidyl, 1-pyrrolidyl, (lower-alkylated)-1-pyrrolidyl and 4-morpholinyl, and R₂ is a lower alkyl radical, which comprises reacting the corresponding lower-alkyl 5-nitro-2-(tertiary-aminoalkoxy)benzoate with a reducing agent effective to reduce nitro groups to amino groups.

16. A process for the preparation of a lower-alkyl 5-amino-2-dialkylaminoalkoxybenzoate having the formula

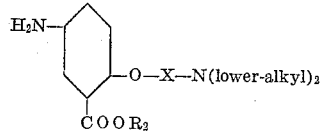

where X is a polycarbon-lower-alkylene radical whose two free valence bonds are on different carbon atoms and R₂ is a lower-alkyl radical, which comprises reacting the corresponding lower-alkyl 5-nitro-2-(dialkylaminoalkoxy)benzoate with a reducing agent effective to reduce nitro groups to amino groups.

17. A process for the preparation of a lower-alkyl 5- amino-2-[(1-piperidyl)alkoxy]benzoate having the formula

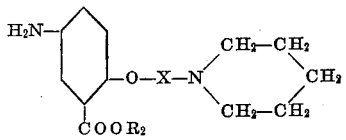

where X is a polycarbon-lower-alkylene radical whose two free valence bonds are on different carbon atoms and $R_2$ is a lower-alkyl radical, which comprises reacting the corresponding lower-alkyl 5-nitro-2-[(1-piperidyl)alkoxy]benzoate with a reducing agent effective to reduce nitro groups to amino groups.

18. A process for the preparation of ethyl 5-amino-2-(2-diethylaminoethoxy)benzoate which comprises reacting the corresponding lower-alkyl 5-nitro-2-(2-diethylaminoethoxy)benzoate with a reducing agent effective to reduce nitro groups to amino groups.

19. A process for the preparation of ethyl 5-amino-2-[3-(1-piperidyl)propoxy]benzoate which comprises reacting the corresponding lower-alkyl 5-nitro-2-[3-(1-piperidyl)propoxy]benzoate with a reducing agent effective to reduce nitro groups to amino groups.

20. A local anesthetic composition comprising: a compound selected from the group consisting of a lower-alkyl 5-amino-2-[lower-tertiary-amino(polycarbon-lower-alkoxy)]benzoate and its acid addition salts; and an excipient.

References Cited in the file of this patent

UNITED STATES PATENTS 2,642,432    Clinton _____ June 16, 1953